US005711606A

United States Patent [19]
Koether

[11] Patent Number: 5,711,606
[45] Date of Patent: Jan. 27, 1998

[54] DIAGNOSTIC SYSTEM FOR A COOKING APPLIANCE

[75] Inventor: Bernard G. Koether, Tequesta, Fla.

[73] Assignee: Technology Licensing Corporation, Tequesta, Fla.

[21] Appl. No.: 549,098

[22] Filed: Oct. 27, 1995

[51] Int. Cl.$^6$ .................................. G01K 3/00; A23L 1/18
[52] U.S. Cl. .................. 374/149; 374/45; 374/102; 99/324; 99/327
[58] Field of Search ................ 374/45, 102, 104, 374/107, 112, 149; 99/324, 337, DIG. 10; 219/490, 494, 497, 499, 501, 506, 507, 508; 364/557

[56] References Cited

U.S. PATENT DOCUMENTS

| | | | |
|---|---|---|---|
| 4,626,663 | 12/1986 | Tateda | 219/497 |
| 4,636,949 | 1/1987 | Longabaugh | 364/400 |
| 4,639,578 | 1/1987 | Payne | 219/450 |
| 4,647,219 | 3/1987 | Figler et al. | 374/102 |
| 4,682,012 | 7/1987 | Wolf et al. | 219/490 |
| 4,782,445 | 11/1988 | Pasquini | 219/494 X |
| 4,788,398 | 11/1988 | Hornung | 219/483 |
| 4,812,963 | 3/1989 | Albrecht et al. | 364/131 |
| 4,843,833 | 7/1989 | Polkinghorne | 62/180 |
| 4,858,119 | 8/1989 | Waugh et al. | 364/557 X |
| 4,920,948 | 5/1990 | Koether et al. | 99/330 X |
| 4,933,887 | 6/1990 | Danko et al. | 364/557 |
| 4,956,793 | 9/1990 | Bonne et al. | 374/43 X |
| 4,962,299 | 10/1990 | Duborper et al. | 219/494 X |
| 5,043,860 | 8/1991 | Koether et al. | 364/557 X |
| 5,259,389 | 11/1993 | Muramoto et al. | 374/102 X |
| 5,349,162 | 9/1994 | Holling | 219/453 |
| 5,350,237 | 9/1994 | Hida | 374/183 |
| 5,378,874 | 1/1995 | Holling et al. | 219/506 |
| 5,545,877 | 8/1996 | Shelton | 374/107 X |

FOREIGN PATENT DOCUMENTS

21357/92  4/1993  Australia ........................... 219/490

Primary Examiner—George M. Dombroske
Assistant Examiner—Paul D. Amrozowicz
Attorney, Agent, or Firm—J. De La Rosa

[57] ABSTRACT

The diagnostic system of the present invention monitors and accumulates the thermal signatures or characteristics during at least one operational mode of the cooking appliance. These thermal signatures or characteristics are collected—through the same temperature sensor used to regulate the temperature of the cooking appliance—and then stored in, for example, a look-up table. Advantageously, this may be accomplished without the need of special sensors or interface boards. The thermal signatures or characteristics may include first order or higher order temperature gradients, as well as temperature profiles. The stored thermal signatures provide a baseline from which the diagnostic system can detect and identify whether the cooking appliance is working under normal operating conditions.

32 Claims, 3 Drawing Sheets

DIAGNOSTIC SYSTEM FOR A COOKING APPLIANCE

TECHNICAL FIELD

The present invention relates generally to a diagnostic system, and more particularly, to a diagnostic system for detecting abnormal cooking conditions or malfunctions in a cooking appliance.

BACKGROUND OF THE INVENTION

Microprocessor based controllers have been developed in recent years to assist in the preparation of properly cooked foods. Typically, such controllers, among other things, regulate the temperature within the cooking appliance to insure that the food is cooked or baked to the proper degree of doneness. Advantageously, such controllers may use intelligent sensing and diagnostics built into the cooking appliance and coupled through an interface board to detect and identify various types of failures. See, for example, U.S. Pat. No. 5,043,860 and applicants' copending application U.S. Ser. No. 08/501211, entitled "Multiprobe Intelligent Diagnostic System For Food-Processing Apparatus" which are commonly assigned and incorporated herein by reference. While these so-called "smart interface" boards perform excellently, they generally require the use of multiple sensors. Accordingly, although these "smart interface" boards are well-suited for modern cooking appliances, they are ill-suited for the hundreds of thousands of cooking appliances manufactured over the last twenty years that use single temperature sensors. While retrofitting these older cooking appliances with additional sensors and interface boards would solve the problem, the associated cost makes it prohibitively expensive to do so.

Accordingly, what is needed is a simple and low cost diagnostic system to diagnose that certain physical characteristics of the cooking appliance are not working properly—all without the need of special sensors and interface boards.

SUMMARY OF THE INVENTION

The diagnostic system of the present invention monitors and accumulates the thermal signatures or characteristics during different operational modes of the cooking appliance. These thermal signatures or characteristics are collected—through the same temperature sensor used to regulate the temperature of the cooking appliance—and then stored in, for example, a look-up table. Advantageously, this may be accomplished without the need of special sensors or interface boards. The thermal signatures or characteristics may include first order or higher order temperature gradients, as well as temperature profiles, collected, for example, when the temperature of the cooking appliance is raised to a desired cooking temperature. The stored thermal characteristics or signatures provide a baseline from which the diagnostic system can detect and identify whether the cooking appliance is working under normal operating conditions.

In one exemplary embodiment, the diagnostic system of the present invention compares the measured temperature gradients collected during an operational mode of the cooking appliance with predetermined or learned minimum and/or maximum value(s) of the temperature gradient. Such minimum and maximum values may be based on any particular set of cooking conditions, including the type and model number of the cooking appliance. Moreover, so-called "fuzzy logic" may be used to identify abnormal operating conditions or malfunctions. Regardless of the logic used, if abnormal operating conditions are detected, an appropriate signal can be displayed to the user or transmitted to a remote monitoring station to effect maintenance.

BRIEF DESCRIPTION OF THE DRAWING

The features and advantages of the present invention will become more readily apparent from the following detailed description of the invention in which like elements are labeled similarly and in which.

DETAILED DESCRIPTION

Without any loss of generality or applicability for the principles of the present invention, in some embodiments the description is directed to cooking appliances, such as fryers. It should be understood, however, that the term cooking appliance shall be understood to include deep fryers, refractory ovens, baking ovens, combination ovens, infrared ovens, rotisseries, and in general temperature control units which, for example, may be cooling units.

Figure 1:
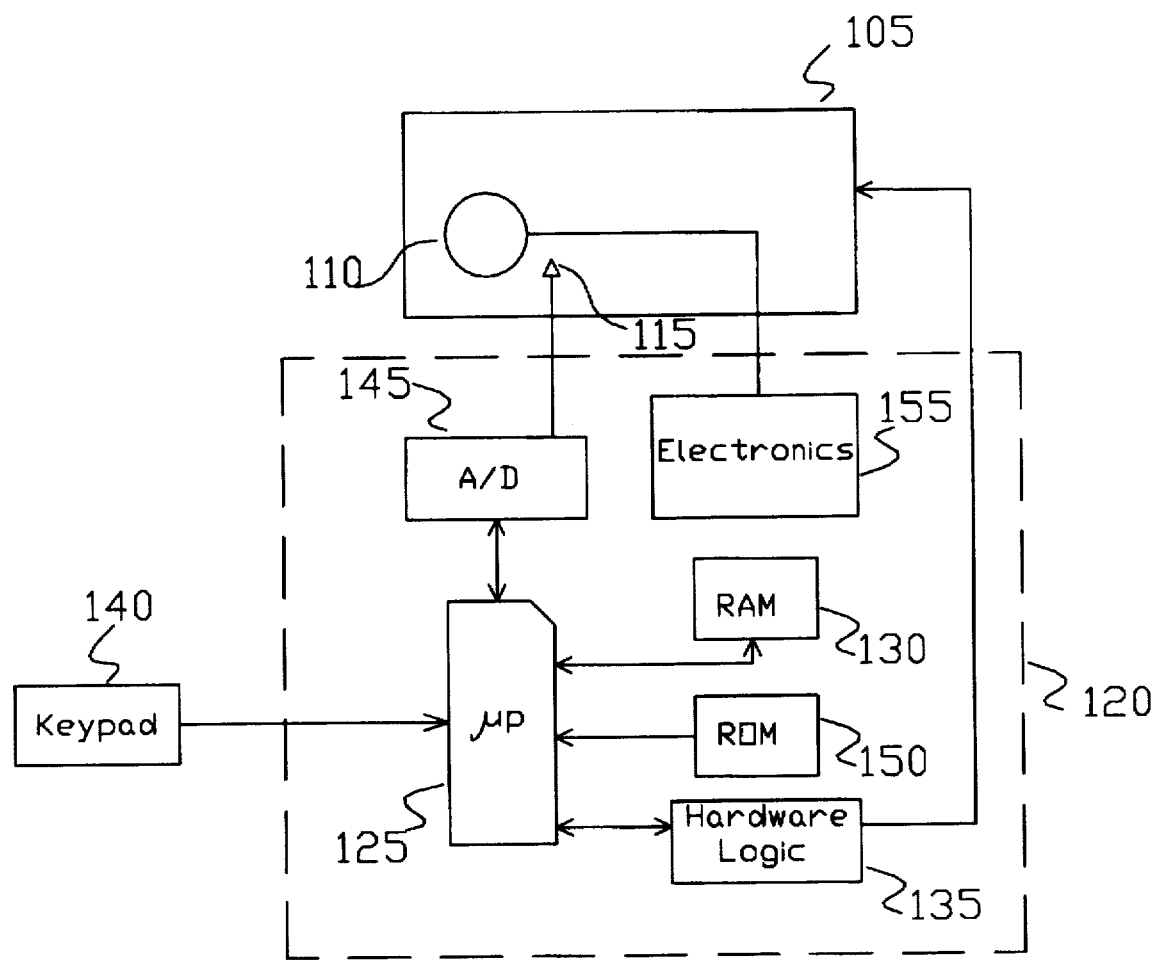
FIG. 1 is a block diagram of a cooking appliance utilizing the diagnostic system of the present invention.

A diagnostic system for use with a cooking appliance 105 having a heating element 110 and thermal probe 115 is shown in FIG. 1. Thermal probe 115 may be located in proximity to heating element 110 so as to measure the temperature at that location, and hence approximate the temperature of heating element 110, such as in an oven. Depending on the type of the cooking appliance, thermal probe 115 alternatively may be located in a location for submersion into the cooking medium, such as cooking oil. In either case, thermal probe 115 measures the temperature of the cooking medium.

A system controller 120 of cooking appliance 105 runs the diagnostic system as well as manages a number of other diagnostic and control functions. Preferably, system controller 120 uses a microprocessor 125 having a random access memory (RAM) 130 and hardware logic 135. Under program control, microprocessor 125 regulates various operations of the cooking appliance, such as, for example, the cooking time and cooking temperature for either a single food product or a plurality of food products. That is, the cooking appliance can be programmed to operate with cooking parameters tailored for a specific product. See, for example, U.S. Pat. No. 4,920,948, which is incorporated herein by reference. Those skilled in the art will readily note that such cooking parameters may be either preprogrammed at the factory or entered by a user at the time of cooking, such as through a keypad 140. Thermal probe 115 is connected to an analog-to-digital converter 145 which supplies digital signals to microprocessor 125 indicative of the temperature of heating element 110 or alternatively the cooking medium. Thermal probe 115 may be resistance temperature detectors, thermistors, thermocouples and the like. The choice of the thermal probe depends on the range of the temperatures to be measured. Microprocessor 125 processes the digital temperature signals using a program and data stored in a read-only-memory 150.

It should be understood that microprocessor 125 includes such hardware as a central processing unit, program and random access memories, timing and control circuitry, input/ output (I/O) interface devices and other digital subsystems necessary to the operation of the central processing unit. Those skilled in the art will readily note that the diagnostic system of the present invention may be completely implemented using analog circuitry. The diagnostic system operates in accordance with a program whose methodology of operation is set forth below herein. This diagnostic program can be stored in conventional random-access-memory 150 or in a pre-programmed chip, such as EPROM or EEPROM. It is contemplated, however, that the diagnostic program may be disabled by depressing a key on keypad 140, if so desired.

During normal operation, system controller 120 of cooking appliance 105 regulates the percentage of time power is applied to heating element 110 in accordance with the cooking parameters selected by the user. For example, the heating element or heating elements may be pulsed with either a fixed or variable duty cycle (proportional control heating), may be fully turned on, or operated in an on/off manner similar to a thermostat, depending on the heating mode of the cooking appliance. Such techniques minimize overshoot and recovery time. The particular technique selected depends, for example, on how rapidly the selected temperature needs to be reached and the amount of overshoot acceptable. The particular technique used to regulate the temperature, however, is not critical to the operation of the present invention inasmuch as the invention may be used with any or all of these techniques.

Preferably, electronics 155 for thermal probe 115 may reside in system controller 120. System controller 120 may have a light emitting diode or vacuum fluorescent device display. Upon receiving the temperature data collected by thermal probe 115 during a cycle(s) or mode(s) of operation of the cooking appliance, system controller 120 automatically runs the diagnostic program in accordance with the principles of the invention. The diagnostic system of the present invention monitors and accumulates the thermal signatures or characteristics during at least one operational mode of the cooking appliance. These thermal signatures or characteristics are collected through thermal probe 115—the same probe used to regulate the temperature of the cooking appliance—and then are stored in random-access-memory 130 in the form of, for example, a look-up table. Advantageously, this is accomplished without the need of special sensors or interface boards. The thermal signatures or characteristics include first order or higher order temperature gradients or temperature profiles collected, for example, when the temperature of the cooking appliance is raised to a desired cooking temperature. For example, in a fryer, the thermal signatures or characteristics may be collected during "cold start," "melt cycle," "cooking," and/or "idle." Preferably, it is done so after the melt cycle and during idle when the cooking appliance is establishing its normal operating temperature. During that time the temperature gradient is substantially constant or fixed. The stored thermal signatures provide a baseline from which the diagnostic system can detect and identify whether the cooking appliance is working under normal operating conditions.

Figure 2:
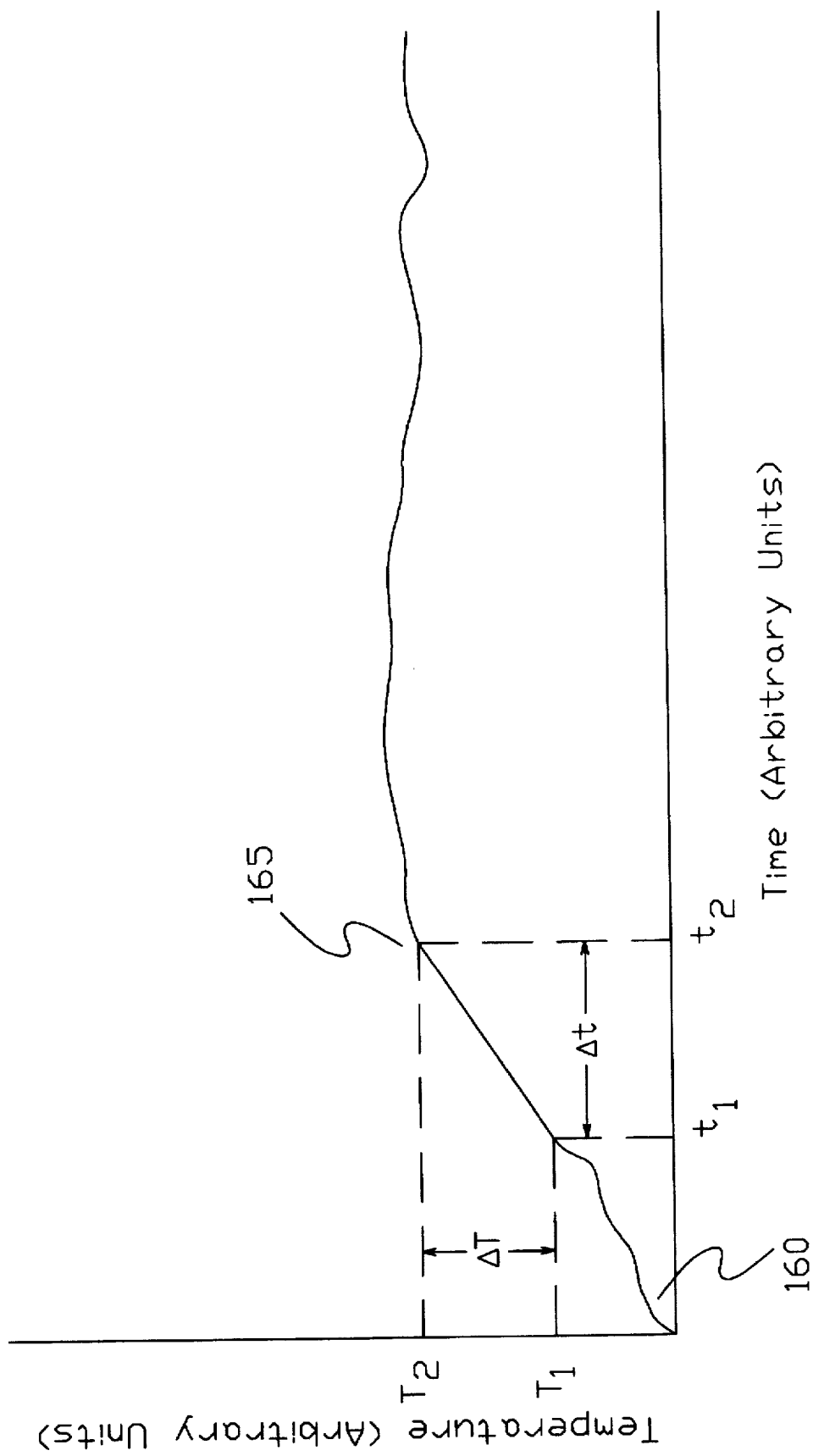
FIG. 2 is a plot of temperature versus time for a typical cooking appliance.

Referring to FIG. 2, in one exemplary embodiment, the diagnostic system of the present invention monitors the temperature from cold start temperature 160 up to an operating temperature 165 of the cooking appliance. Then, the diagnostic system calculates the thermal gradient during the time heating element 110 is fully on by determining the differential change in temperature, $\beta T = T_2 - T_1$, during the time $\beta t = t_2 - t_1$. Inasmuch as the microprocessor regulates the amount and the manner in which power is applied to the heating element, it is relatively straightforward to measure the temperature at different portions of the temperature profile of the cooking appliance, regardless of the manner in which the heating element is controlled.

Those skilled in the art will also readily note that the time, $\Delta t$, may be tracked through the use of software counters. The quantity $\Delta T/\Delta t$, however, is the first order thermal gradient. The calculated temperature gradient is then compared with predetermined or learned minimum and/or maximum values of the temperature gradient. Such minimum and maximum values are usually determined empirically from a cooking appliance known to function properly and may be based on any particular set of cooking conditions, including the type and model number of the cooking appliance.

Alternatively, in another embodiment, the temperature profile(s)—that is, its shape—or any portion thereof is measured and stored. The temperature profile varies according to the particular malfunction. Once the temperature profiles are empirically determined for known malfunctions, subsequent temperature profiles may be matched to those associated with particular malfunctions for identification.

Figure 3:
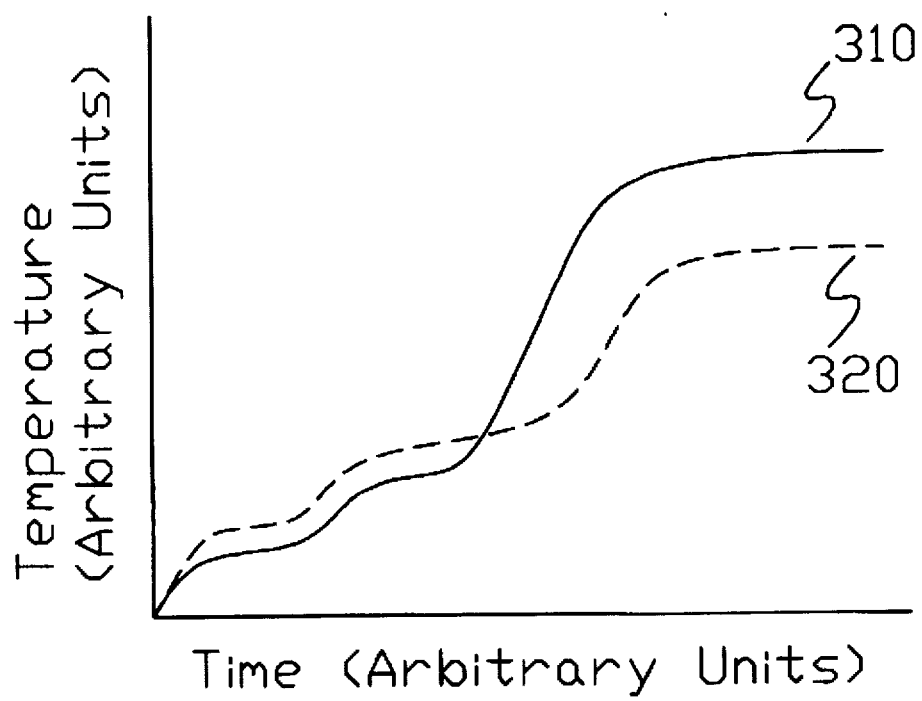
FIG. 3 is a plot of the temperature characteristics or profiles of a cooking appliance.

Referring to FIG. 3, thermal profiles 310 and 320 for a cooking appliance that is operating properly and improperly, respectively, are depicted. Thermal profile 310 may be saved and stored in the memory of microprocessor 125 as training data. Accumulation of the thermal profiles for different malfunctions, such faulty heating elements and electronics, provides a baseline for diagnostics purposes. Such training data may be used to teach the diagnostic system to diagnose between normal and abnormal operating conditions.

Factors that may affect the measured temperature gradient or temperature profile include: gas pressure and available BTU energy; electrical voltage; amount and type of cooking medium in the cooking appliance; and/or malfunctioning heating elements or heat exchangers. Any improper operation in the heating manifest itself as a variation in the temperature gradient or temperature profile outside the normal range of operations. It is contemplated that in certain instances, higher order temperature gradients may be used where the desired temperature profile or a portion thereof is not substantially linear, such as during proportional control heating. If the diagnostic program determines that the measured temperature characteristics, such as the temperature gradient, are outside the normal operating range, an appropriate signal—either audible or visual—can be displayed to the user or transmitted, including by wireless means, to a remote monitoring station to effect maintenance. For example, the communication system of U.S. Pat. No. 4,812,963, which is incorporated herein by reference, may be used to provide real-time diagnostic information to a remote station. In that latter instance, the remote monitoring station may interrogate the cooking appliance for additional information and then make an independent judgment as to the necessity of repair.

It is contemplated that the present diagnostic system will monitor and accumulate the thermal characteristics of the cooking appliance from cold start through its operation during the day until shut down. During that period, the diagnostic system can statistically determine—based on collected thermal data—on the performance of the cooking appliance. Minor deviations may be recorded and stored in memory or in a file to later provide a temperature profile history to assist a technician in serving the appliance, if a later failure occurs. If the deviation, however, is gross, it may display to the operator a message warning that the cooking appliance is unacceptable for cooking purposes. If desired, the diagnostic system may be programmed in the latter case to disable the cooking appliance to eliminate any possible health risks.

In addition, acceptable values for the temperature gradients for different cycles or modes of operation of the cooking appliance can be stored in the look-up table. For example, when the heating element is either pulsed at fixed or variable duty cycles the corresponding acceptable temperature gradients or profiles can be stored and then compared with the measured gradients or profiles. As the cooking appliance ages, the acceptable values can also be updated so as to accommodate this change. This updating can be effected through the use of a portable computer that downloads to the system controller the acceptable values for the thermal characteristics. Alternatively, the diagnostic system can be programmed to learn or determine, for example, its own maximum or minimum values for the temperature gradient based on the past operating conditions of the cooking appliance. That is, the diagnostic system learns what the normal range of values should be. Various programming techniques for effecting this latter methodology are well known in the art and may include the use of statistics, such weight averaging, standard deviation and the like, as well as artificial intelligence or logic called "fuzzy-logic".

In results from experiment practice using 14" Pitco gas and electric fryers manufactured by Blodgett, Inc., the acceptable temperature gradient ranges were determined empirically for the cooking appliance. Some exemplary values are tabulated below:

| 14" Pico Fryer $\Delta T = 250-300°$ F. | | | |
|---|---|---|---|
| Normal Time Range $\Delta t$ (sec) | | Normal Gradient Range $\Delta T/\Delta t$ (°F./sec) | |
| Electric | Gas | Electric | Gas |
| 91 | 116 | 0.55 | 0.43 |
| 85 | 73 | 0.59 | 0.68 |
| 101 | 110 | 0.50 | 0.45 |
|  | 112 |  | 0.45 |
|  | 98 |  | 0.51 |
|  | 97 |  | 0.52 |

From the above, the temperature gradient ranges were 0.50–0.59 (° F./sec) and 0.43–0.68 (° F./sec) for the electric and gas fryers, respectively. After additional data collection, however, it was empirically determined that the normal average temperature gradients were 0.53 (° F./sec) and 0.47 (° F./sec) for the electrical and gas fryers, respectively. Failures occurred at temperature gradients below 0.36 (° F./sec) and 0.35 (° F./sec) for the electric and gas fryers, respectively. As such, the diagnostic system of the present invention indicated malfunctions in several fryers having a temperature gradient below these empirically determined minimum temperature gradients. Upon inspecting those fryers, they either had defected heating element(s) or improper line voltages to the heating element. Although it is typically the case that the malfunction is associated with a temperature gradient that is too low, it should be understood that a temperature gradient that is too high will also be indicative of a malfunction.

It is understood that the embodiment herein is merely illustrative of the principles of the invention. Various modifications may be made by those skilled in the art which will embody the principles of the invention and fall within the spirit and the scope thereof.

I claim:

1. A diagnostic system for a cooking appliance having a heating element, said diagnostic system comprising:

a thermal probe to measure the temperature at or near said heating element;

means responsive to said thermal probe for acquiring the thermal profile of the cooking appliance over a predetermined time period; and means for comparing said acquired thermal profile with known thermal profiles of the cooking appliance; and means for identifying a malfunction in the cooking appliance based on the comparison between said acquired and known thermal profiles of the cooking appliance.

2. The diagnostic system of claim 1 wherein said known thermal profiles are indicative of a particular malfunction of said cooking appliance.

3. The diagnostic system of claim 1 wherein said heating element is pulsed with a fixed or variable duty cycle, fully turned on, or operated in an on/off manner similar to a thermostat to regulate the temperature of a cooking medium.

4. The diagnostic system of claim 1 further comprising means for downloading from a computer the known thermal profiles of the cooking appliance.

5. The diagnostic system of claim 1 further comprising means for indicating to a user the malfunction.

6. The diagnostic system of claim 1 further comprising means for transmitting to a remote station information concerning the malfunction of the cooking appliance.

7. The diagnostic system of claim 6 wherein said means for transmitting includes wireless communication.

8. The diagnostic system of claim 1 further comprising a look up table having stored therein said known thermal profiles.

9. The diagnostic system of claim 1 further comprising means for updating said known thermal profiles based on the past operating conditions of the cooking appliance.

10. A cooking appliance for cooking a food product in a cooking medium, said cooking appliance having a diagnostic system comprising:

a heating element to heat the cooking medium;

a temperature sensor to measure the temperature of the cooking medium;

a microprocessor operatively connected to said heating element so as to regulate the temperature of the cooking medium, during a predetermined period said microprocessor measuring the temperature profile of said cooking medium, and then comparing the measured temperature profile with minimum and/or maximum values for said temperature profiles; and means for indicating a malfunction when said measured temperature profile is outside the range defined by said minimum and/or maximum values.

11. The cooking appliance of claim 10 wherein said heating element is pulsed with a fixed or variable duty cycle, fully turned on, or operated in an on/off manner similar to a thermostat to regulate the temperature of a cooking medium.

12. The cooking appliance system of claim 10 further comprising means for downloading from a computer the minimum and/or maximum values for said temperature profile.

13. The cooking appliance system of claim 10 further comprising means for transmitting to a remote station information concerning the malfunction of the cooking appliance.

14. The cooking appliance of claim 13 wherein said means for transmitting includes wireless communication.

15. The cooking appliance of claim 10 further comprising a look up table having stored therein at least said minimum and/or maximum values of the temperature profile.

16. The cooking appliance of claim 10 further comprising means for updating said minimum and/or maximum values of the temperature profile based on the past operating conditions of the cooking appliance.

17. In a cooking appliance of the type regulating the temperature of a cooking medium through at least proportional control heating, the improvement comprising:

means for acquiring the thermal profile of the cooking appliance;

means for comparing said acquired thermal profile with known thermal profiles of the cooking appliances, each indicative of a specific malfunction; and means for identifying the specific malfunction based on the differences between said acquired and known thermal profiles.

18. The improvement of claim 17 further comprising means for downloading from a computer the known thermal profiles of the cooking appliance.

19. The improvement of claim 17 further comprising means for indicating to a user the malfunction.

20. The improvement of claim 17 further comprising means for transmitting to a remote station information concerning the malfunction of the cooking appliance.

21. The improvement of claim 20 where said means for transmitting includes wireless communication.

22. The improvement of claim 17 further comprising a look up table having stored therein said known thermal profiles.

23. The improvement of claim 17 further comprising means for updating said known thermal profiles based on the past operating conditions of the cooking appliance.

24. A method for diagnosing faulty operation of an apparatus having a heating element, said method comprising the steps of:

measuring the temperature at or near said heating element;

acquiring the thermal profile of the apparatus over a predetermined time period; and comparing said acquired thermal profile with known thermal profiles of the apparatus; and identifying a malfunction in the apparatus based on the comparison between said acquired and known thermal profiles.

25. The method of claim 24 wherein said known thermal profiles are indicative of a particular malfunction of said apparatus.

26. The method of claim 24 further comprising the step of pulsing said heating element with a fixed or variable duty cycle, fully turning on said heating element, or operating said heating element in an on/off manner similar to a thermostat while acquiring said thermal profiles of the apparatus.

27. The method of claim 24 further comprising the step of downloading from a computer the known thermal profiles of the apparatus.

28. The method of claim 24 further comprising the step of indicating to a user the malfunction.

29. The method of claim 24 further comprising the step of transmitting to a remote station information concerning the malfunction of the apparatus.

30. The method of claim 26 wherein said transmitting to a remote station includes wireless communication.

31. The diagnostic system of claim 24 further comprising the step of storing in a look up table said known thermal profiles.

32. The diagnostic system of claim 24 further comprising the step of updating said known thermal profiles based on the past operating conditions of the apparatus.

* * * * *